(12) United States Patent
Gorjanc et al.

(10) Patent No.: US 8,272,276 B2
(45) Date of Patent: Sep. 25, 2012

(54) DIELECTRIC TEXTURED ELASTOMER IN A PRESSURE MAPPING SYSTEM

(75) Inventors: Timothy Carl Gorjanc, Calgary (CA); Ian Main, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 45 days.

(21) Appl. No.: 12/436,713

(22) Filed: May 6, 2009

(65) Prior Publication Data

US 2010/0282000 A1    Nov. 11, 2010

(51) Int. Cl.
 *G01D 7/00* (2006.01)
(52) U.S. Cl. ........................ 73/862.046; 73/780
(58) Field of Classification Search .......... 73/862.041–862.046, 780
 See application file for complete search history.

(56) References Cited

U.S. PATENT DOCUMENTS

| | | | |
|---|---|---|---|
| 3,565,195 A | | 2/1971 | Miller et al. |
| 3,826,926 A | * | 7/1974 | White et al. ............... 377/57 |
| 3,875,481 A | | 4/1975 | Miller et al. |
| 4,005,438 A | * | 1/1977 | Meltzer et al. ............. 347/121 |
| 4,266,263 A | | 5/1981 | Haberl et al. |
| 4,370,697 A | | 1/1983 | Haberl et al. |
| 4,584,625 A | | 4/1986 | Kellogg |
| 4,986,136 A | | 1/1991 | Brunner et al. |
| 5,010,772 A | * | 4/1991 | Bourland et al. ......... 73/862.046 |
| 5,306,912 A | * | 4/1994 | Sibbald et al. .............. 250/334 |
| 5,401,922 A | * | 3/1995 | Asta ............................ 200/5 A |
| 5,447,076 A | | 9/1995 | Ziegler |
| 5,514,832 A | * | 5/1996 | Dusablon et al. ........... 174/15.1 |
| 5,653,939 A | * | 8/1997 | Hollis et al. ..................... 506/3 |
| 5,693,886 A | | 12/1997 | Seimiya et al. |
| 6,826,968 B2 | | 12/2004 | Manaresi et al. |
| 7,067,979 B2 | * | 6/2006 | Sakamoto ..................... 313/584 |
| 7,580,030 B2 | * | 8/2009 | Marten ......................... 345/173 |
| 7,609,178 B2 | * | 10/2009 | Son et al. ........................ 341/33 |
| 7,638,350 B2 | * | 12/2009 | Deconde et al. ................ 438/53 |
| 2004/0133092 A1 | * | 7/2004 | Kain ............................. 600/377 |
| 2008/0180390 A1 | * | 7/2008 | Yoshikawa .................... 345/156 |

\* cited by examiner

*Primary Examiner* — Max Noori
(74) *Attorney, Agent, or Firm* — Fenwick & West LLP (57) ABSTRACT

A capacitance pressure mapping system includes a plurality of sensor cells created by the intersection of electrode columns and rows, and a solid elastomer dielectric separating the electrode columns and rows. The elastomer is at least one planar sheet having a surface comprising a pattern of projections. There may be two sheets having opposing patterns of projections. The opposing patterns may be interlocking or corresponding.

14 Claims, 6 Drawing Sheets

DIELECTRIC TEXTURED ELASTOMER IN A PRESSURE MAPPING SYSTEM

FIELD OF THE INVENTION

The present invention is directed to a dielectric elastomer in a pressure mapping system.

BACKGROUND

One class of pressure mapping systems are based on a matrix of capacitors in which a thin, flexible elastomer is used as the dielectric. When pressure is applied to the capacitor, the dielectric material is compressed and the capacitance changes. The sensing mechanism of the sensor depends on two main factors: the mechanical properties and the geometry of the elastomer. Both of these properties determine the creep, compression set, and hysteresis of the sensor.

To generate a pressure map, an array of m rows and n columns of conductive strips are separated by a the thin compressible elastomeric dielectric. This creates an m×n array of sensor elements which are rastered to generate a map of the pressure distribution. An electrical signal is applied sequentially to each row, and the attenuated signal is detected sequentially from each column. The pressure applied to any individual sensor element will compress the elastomer, and increase the capacitance of the element, thus increasing the detected signal strength. The signal strength is correlated to a pressure value through a process of calibration. All adjacent rows and columns are switched to electrical ground to reduce interference between contiguous sensor projections. It is assumed that each sensor element is an independent entity and that an applied pressure on one sensor element does not affect the output of another sensor element.

The elastomer is conventionally a foam material, or a solid, non-foam sheet.

Foams are classified as either open or closed cell. In the open cell structure, the cells (air pockets) are interconnected while in the closed cell structure there is a predominance of non-interconnecting cells. Closed cell foams typically have higher compressive strength due to their structures and are also generally denser and heavier than open cell foams. Foams are extremely lightweight and flexible compared to non-foam dielectrics and can be very sensitive to low applied pressures.

Unfortunately, one of the largest drawbacks to foams is the inherent random nature of the cell structure. The cell structure is the source of the substantial creep and large amounts of hysteresis which is characteristic of both open and closed cell foams. The rebound of foam when pressure is decreased tends to be much slower than a solid elastomer due to the fact that air (or some other gas) needs to re-enter the foam to prevent a vacuum from foaming within the cells. Slower response time and greater compression set make it difficult to detect dynamically changing loads accurately. A sensor using foam may experience inaccuracies such as a lack of repeatability due to the inconsistency of the film, unpredictable deformation, and mechanical instability. These factors create problems when foam is used in a capacitive pressure sensor.

Solid elastomer dielectrics ameloriate some of the issues that the use of foam presents. The simplest way to employ a solid elastomer as the dielectric is via a uniform solid sheet The hardness of the elastomer will have a large impact on the physical properties of the final film. A low durometer elastomer will be softer, more flexible, and have a higher sensitivity at low pressures compared to a high durometer elastomer, but will exhibit more creep and have a lower maximum pressure limit. The chemistry of the elastomer will also affect the final physical properties such as tear resistance. When compared to foam, solid elastomers will typically have a higher density but may have comparable flexibility.

If a solid sheet elastomer is compressed under a single point load, the sheet will be compressed in the region under the applied force. Depending on the material composition, the depression can be localized or may spread radially outwards. If there are multiple compression points that are in close proximity, the deformation of the elastomer in the vicinity of each depression can be unpredictable and leads to buckling of the sheet or an increase in thickness, which is the primary problem with using a solid sheet. This is due in part because when the solid sheet is compressed, there is no empty space for the compressed material to expand into without distorting the surrounding uncompressed material.

A solid sheet is also less compressible and will reach its maximum compression quickly and will thus saturate the sensor. Therefore, solid sheets are less sensitive to changes in pressure.

The use of a patterned solid elastomer may mitigate one or more of the disadvantages of the prior art.

SUMMARY OF THE INVENTION

In one aspect, the invention comprises a pressure mapping system comprising a plurality of sensor cells created by the intersection of electrode columns and rows, and a solid elastomer dielectric separating the electrode columns and rows and comprising at least one planar sheet having two major surfaces, wherein at least one major surface comprises a pattern of projections. The projections may comprise single point projections and the pattern of projections comprises a plurality of rows or columns. Alternatively, the projections may comprise a plurality of lines, which may be parallel lines.

In one embodiment, the dielectric may be comprised of two planar sheets disposed such that the pattern of projections are opposing. The opposing pattern of projections may be interlocking or corresponding. The opposing patterns of projections may each be a plurality of substantially parallel lines, and the opposing patterns are at an angle to each other.

In one embodiment, each single point projection has a planar cross-sectional shape comprising a circle, an oval, a quadrilateral, a triangle, or an irregular shape. Each single point projection has a vertical cross-sectional shape comprising a square, a rectangle, a trapezoid, a semi-circle, a semi-oval, a triangle or an irregular shape.

In an alternative embodiment, each line projection has a vertical cross-sectional shape comprising a square, a rectangle, a trapezoid, a semi-circle, a semi-oval, a triangle or an irregular shape.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The invention relates to pressure mapping systems comprising patterned solid sheet elastomer dielectrics. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

| | |
|---|---|
| Column | A Column refers to the conductor that carries the excite signal from the electronics to the Sensor Cell. |
| Compression Set | The permanent deformation remaining after release of a compressive stress. |
| Creep | The slow deformation of an object resulting from constant stress applied over long periods of time. |
| Dielectric | A non-conducting substance, when referring to a material. |
| Durometer | A method to express the hardness of a material. The typically used durometer scale for elastomers is the Shore A scale. A Shore A hardness of 25 is equivalent to that of a rubber band and a Shore A hardness of 100 is equivalent to Ebonite rubber or a hard skateboard wheel. |
| Elastomer | A polymer with elastic properties |
| Frame | The set of sensor cells defined by the m row x n column matrix of the sensor in a single point in time which creates a pressure image. |
| Hooke's Law | An approximation that states that the amount by which a material body is deformed is linearly related to the force causing the deformation. |
| Hysteresis | A property of some elastomers where the strain due to a given stress is larger when the stress is decreasing than when it is increasing. A graph of stress versus strain, while stress is gradually applied then removed, produces a loop with the area proportional to the energy dissipated in the material. |
| Polymer | A large molecule composed of repeating structural units (mers) connected by covalent chemical bonds. |
| Pressure Image | The two dimensional pressure data graphically presented as an m x n matrix at a single point in time. |
| Row | A Row refers to the conductor the carries the excite signal from the Sensor Cell to the measurement electronics. |
| Sensor | The device that contains individual Sensor Cells that deform under pressure thus causing changes in the Cells internal capacitive coupling that can be measured by an external device. |
| Sensor Cell | The intersection of two perpendicular conductors who's capacitive coupling changes under pressure. The Sensor Cells are typically arranged in rows and columns within a Sensor. |
| Young's Modulus | The measure of the stiffness of an isotropic elastic material. |

Pressure imaging is a method of graphically displaying the pressure distribution between two interface surfaces using a pressure sensing matrix. A suitable pressure imaging system comprises a matrix of capacitive pressure sensors formed into a continuous film. This film is placed between two interface surfaces, and connected to an electronics module that translates the physical compression of each cell of the matrix into a capacitance value that is correlated to pressure. This data is then displayed on a computer screen to show a map of the interface pressures between the two surfaces. Slight variations in the pressure distribution between the two surfaces can be detected.

Figure 9:
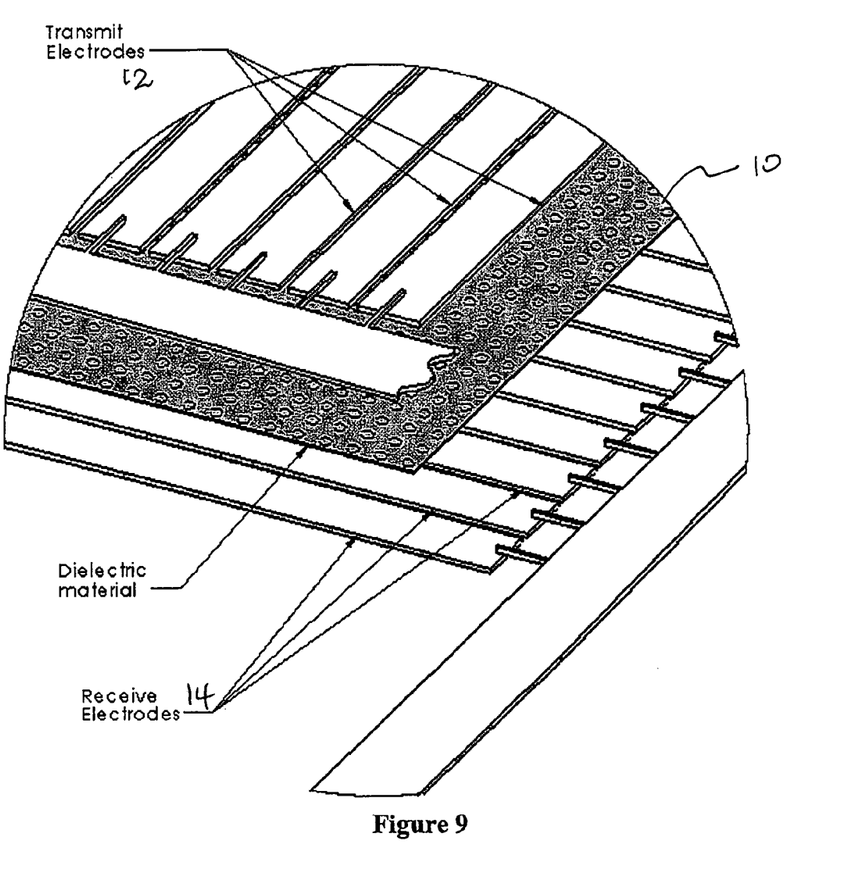
FIG. 9 shows a schematic of a portion of a pressure sensing system comprising a textured single sheet dielectric.

In one embodiment, the pressure imaging system is comprised of two grids of parallel conductive strips that are set perpendicular in orientation. The grids are separated by a thin compressible elastomer (10). To generate a pressure map, an array of m rows (12) and n columns (14) of conductive strips are separated by the dielectric (10). A sensor cell is created at each intersection of the rows and columns. This creates an m×n array of sensor cells which are rastered to generate a map of the pressure distribution. An electrical signal is applied sequentially to each row (12), and the attenuated signal is detected sequentially from each column (14). The pressure applied to any individual sensor cell will compress the elastomer (10), and increase the capacitance of the cell, thus increasing the detected signal strength. The signal strength is correlated to a pressure value through a process of calibration. All adjacent rows and columns are switched to electrical ground to reduce interference between contiguous sensor cells. It is assumed that each sensor cell is an independent entity and that an applied pressure on one sensor cell does not affect the output of another sensor cell.

Each sensor cell can be considered to be a parallel plate capacitor where the capacitance is given by:

$$C = \frac{\varepsilon_r \varepsilon_o A}{d} \quad (1)$$

Figure 1:
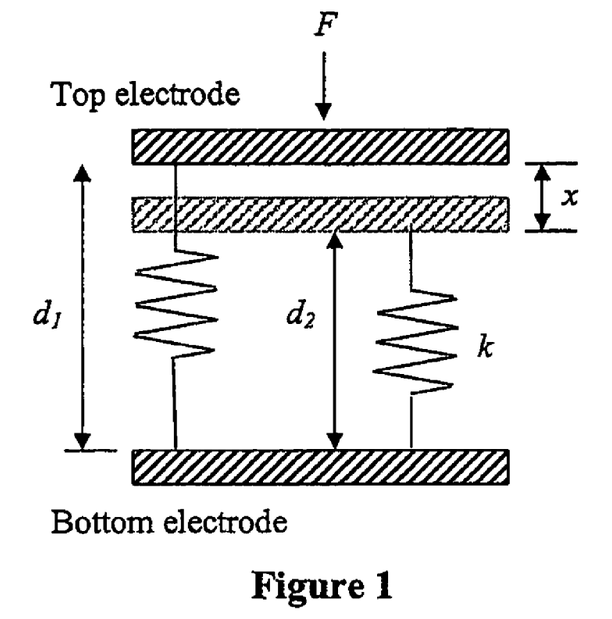
FIG. 1 shows a schematic depicting an idealized sensor cell before and after compression where k is the spring constant, $d_1$ and $d_2$ is the plate separation before and after compressions, respectively.

$\varepsilon_r$ and $\varepsilon_o$ are the relative permittivity and vacuum permittivity, respectively, A is the area of the sensor projection which is defined by the overlap area between the top and bottom electrodes, and d is the separation of the top and bottom electrodes in the sensor projection. FIG. 1 depicts a cross sectional image of the ideal sensor before and after pressure is applied. It is assumed that each electrode is rigid and does not deform under pressure and that the applied pressure is uniform across the sensor projection. This measurement technique indirectly measures the change in separation of the two electrodes and the change in capacitance can be correlated to a change in pressure by an appropriate calibration method. The voltage drop across the capacitor can be expressed as:

$$V_{drop} = \frac{Qd}{\varepsilon_r \varepsilon_o A} \tag{2}$$

where Q is the charge on the plate. The smaller the voltage drop is, the stronger the signal is leaving the capacitor. From this we see that a smaller plate separation will decrease $V_{drop}$, and that a larger dielectric constant or area will also lower $V_{drop}$. This places some boundaries on the selection of a dielectric material: it must be thin and have a high dielectric constant to ensure a strong transmitted signal.

In the idealized model of a capacitive pressure sensor, the dielectric material acts as an ideal spring, obeying Hooke's Law, $$F = -kd, \tag{3}$$

where F is the force, k is the spring constant, and d is the displacement. Hooke's Law can also be expressed in terms of the stress and strain:

$$\sigma = E\epsilon, \tag{4}$$

where $\sigma$ is the stress, $\epsilon$ is the strain, and E is Young's Modulus (stiffness). In this model, the compression is assumed to be isotropic and linear over the entire compression range and that the effects of creep and hysteresis can be neglected.

In an idealized sensor, the dielectric material is assumed to compress linearly over the entire pressure range and is completely recoverable. In a real sensor, the response of the dielectric can vary from mildly non-linear (e.g. quadratic dependence) to highly non-linear. The amount of compression that the dielectric material will experience defines the dynamic range of the sensor and thus the usable range of measurement and sensitivity. Additionally, other physical phenomena such as creep, hysteresis, and compression set will effect how the material reacts to pressure and thus the overall performance and accuracy of the sensor.

Creep is defined as the time-dependent change in strain following a step change in stress. Typically, in polymers, creep at strain levels below 1% is completely recoverable without the need for annealing. At higher strain levels, it is possible for the material to not return to its original dimension and remain slightly compressed. This phenomenon is referred to as compression set.

Figure 2:
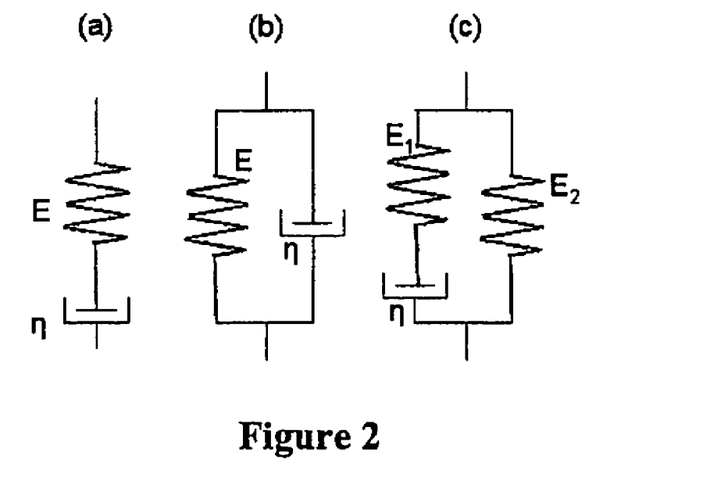
FIGS. 2A, 2B and 2C shows illustrations of the (a) Maxwell, (b) Voigt, and (c) standard linear solid spring-dashpot mechanical analogs respectively. E is Young's modulus (stiffness) of the spring and η is the viscosity of the dashpot.

Creep and relaxation can be modeled by a spring-dashpot mechanical analog. Each spring has a dedicated spring constant (or stiffness, E) and each dashpot has its own viscosity, $\eta$. Some common examples are the Maxwell, Voigt, and standard linear models, shown in FIG. 2.

The Maxwell model consists of a spring and dashpot connected together in series. The Voigt model consists of the spring and dashpot connected in parallel. The standard linear solid model contains three projection; a spring and dashpot connected in series (a Maxwellian projection), which is all in parallel with another spring. For the standard linear solid the creep rate, $d\epsilon/dt$, can be modeled by $$\frac{d\varepsilon}{dt} = \frac{E_1}{\eta(E_1 + E_2)}\left(\frac{\eta}{E_1}\frac{d\sigma}{dt} + \sigma - E_2\varepsilon\right) \tag{5}$$

Figure 3:
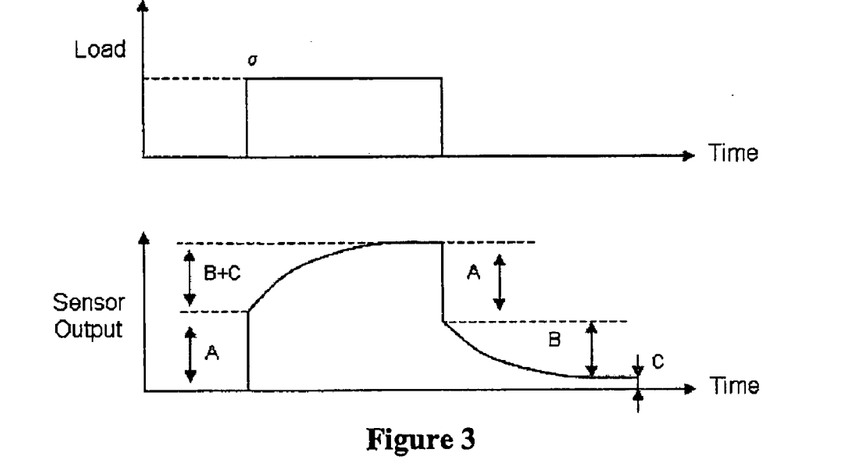
FIG. 3 shows the response of a sensor with a linear viscoelastic dielectric sensing material. A: immediate elastic deformation (recovery), B: delayed elastic deformation, C: Newtonian flow.
Figure 4:
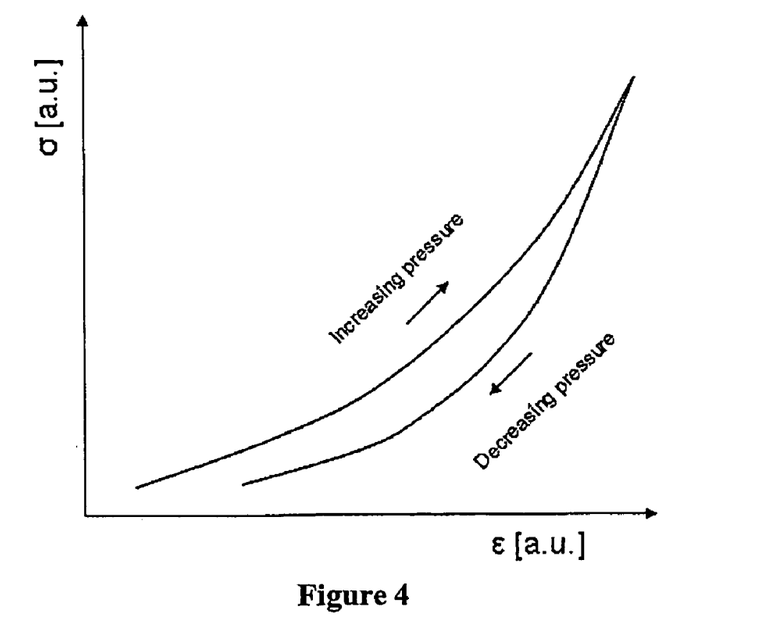
FIG. 4 shows an example of a stress-strain curve for a non-linear elastomer dielectric material in compression only.

FIG. 3 depicts the response of a pressure sensor with a linear viscoelastic material as the dielectric to a step applied load, $\sigma$. There are three distinct components to the response: region A, the immediate elastic deformation; region B, the delayed elastic deformation; and region C, Newtonian Flow. The delayed elastic deformation, also referred to as the recovery, is directly proportional to the stress that has previously been applied (Boltzmann superposition principle). All of these phenomena are inherit to the sensing material and will be present in a pressure sensor regardless of the type of dielectric.

Although the Standard Solid Model can describe the behaviour of a viscoelastic solid in response to instantaneous loads and loads applied over long time intervals, the model lacks the ability to accurately model systems numerically.

The Boltzmann superposition principle states that the creep is a function of the entire past loading history of the sample and that the total deformation is the sum of all of the individual deformations from the previous loading steps. Accordingly, regardless of the type of dielectric material used, the past loading and unloading history of a sensor will impact current measurements and that a sensor will have an intrinsic reset time to erase the previous loading history. In foam-based sensors, this intrinsic time is much longer than that of the patterned solid elastomers of the present invention (for the same load and loading time.)

Hysteresis is another phenomenon of pressure sensors. In general, hysteresis refers to a lag between the cause and effect and is most commonly observed in ferromagnetism. When referring to hysteresis in pressure sensors, we are referring to the elastic hysteresis of the dielectric material. This means that when the sensor is compressed and released, the initial and final pressures that the sensor detects will be different even though the actual applied pressure is the same. The area bounded by the loading and unloading curves (in the stress-strain graphs) represents the energy lost in the system.

Hysteresis is a manifestation of several physical parameters; compression set, internal and external friction, energy loss, etc, which make the elastomer behave as a "real" spring and not an "ideal" spring. When foam is used as the sensing projection, hysteresis is exaggerated due to the slow recovery of the cells in the foam to their original shape. Hysteresis loops can be generated, as in ferromagnetism, which can provide insight into how much hysteresis different elastomer formulations as well as different physical geometries possess.

Compression set is the permanent deformation that results when an elastomer is compressed beyond its elastic limit and the internal structure is partially or completely destroyed and will no longer return to its previous shape. The point at which permanent deformation occurs defines the upper pressure limit that can be applied to the sensor without permanently damaging it.

In one embodiment, the hardness range of the patterned elastomer may be chosen based on several criteria: what the minimum and maximum pressure will be and how much creep and hysteresis will be permitted. All of these factors are inter-related. For example, a soft elastomer with a 30 Shore A hardness will be suitable for low pressure applications due to the easy deformation of the material, but may exhibit unacceptable amounts of creep at higher pressures. Conversely, an elastomer with a 70 Shore A hardness might have poor low pressure performance due to the inability of the elastomer to deform under low pressure, but will be able to operate at higher pressures with less creep.

The elastomer may comprise a natural rubber such as latex or a synthetic rubber such as ethylene proplyene diene (EPDM), polyurethane, polybutadiene, or polysiloxane. The only limitation to material selection is that the material can be processed into the desired shape and that the material has favourable mechanical properties. In one embodiment, the hardness range for a suitable elastomer is 30-70 Shore A.

In one embodiment, the dielectric elastomer (10) comprises a plurality of evenly spaced discrete projections. As one skilled in the art will appreciate, each projection will be aligned with a sensor cell created by the intersection of an column and a row in the pressure sensing grid. In one embodiment, each sensor cell comprises at least one projection, and may comprise a plurality of projections. A elastomer sheet with a pattern of spaced discrete projections is said to be textured or patterned herein.

Figure 5:
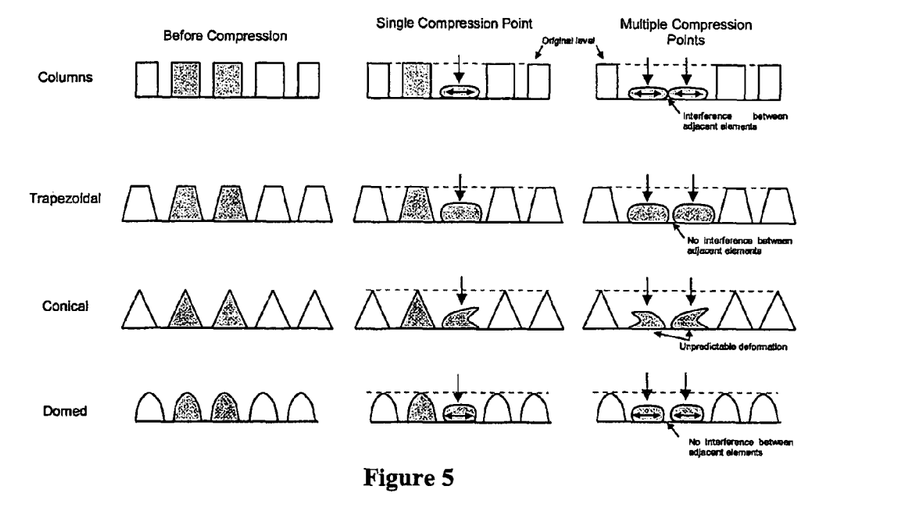
FIG. 5 shows an illustration depicting the effect of rectangular, trapezoidal, and triangular projections and their behavior when a compressive force is applied. The small arrows within the elastomer (shaded portion) illustrate the direction of deformation.

The space between the projections provides a void space which the compressed material may expand into. These discrete projections may take on various shapes defined by its planar cross-sectional shape (parallel to the major surface of the dielectric) and its vertical cross-sectional shape (perpendicular to the major surface). The planar cross-sectional shape may comprise a circle, an oval, a quadrilateral, a triangle, or an irregular shape. The vertical cross-sectional shape may comprise a square, a rectangle, a trapezoid, a semi-circle, a semi-oval, a triangle or an irregular shape. Various exemplary vertical cross-sectional shapes are shown in FIG. 5. A single compression point on one of the rectangular projections, for example, will result in "perfect" compression with the sidewalls bulging outwards normal to the applied force as per Poisson's ratio.

There are three major issues which must be taken into consideration when designing a patterned elastomer: mechanical interference, mechanical stability, and predictable deformation.

If the projections are spaced too close together then there will be mechanical interference between adjacent projections when the dielectric film is compressed (shown in FIG. 5). By having mechanical interference between adjacent projections, the deformation of the projections under compression can be restricted in certain directions and can be unpredictable. Conversely, spacing the projections too far apart in an effort to prevent any physical interaction between adjacent projections may result in a loss of spatial resolution of the sensor.

In one embodiment, the discrete projections each comprise a variable geometry to provide more resistance to compression as the applied force is increased. These structures comprise a decreasing planar cross-sectional area, and may include trapezoidal, hemi-spherical (domed), triangular (conical or pyramical) vertical cross-sections. Such variable geometry will give more stability, strength, and resistance to creep than a rectangular columnar structure (see FIG. 5). By designing the projection with a decreasing planar cross-sectional area, the projection becomes more stable and deformation of the projection should be more predictable with applied pressure.

Regardless of the geometry of the projections, the projection spacing helps define the maximum load limit that the sensor can detect. If the load is large enough to create mechanical interference between adjacent projections, then pressure measurements at or above that applied load can not be reliable.

Figure 6:
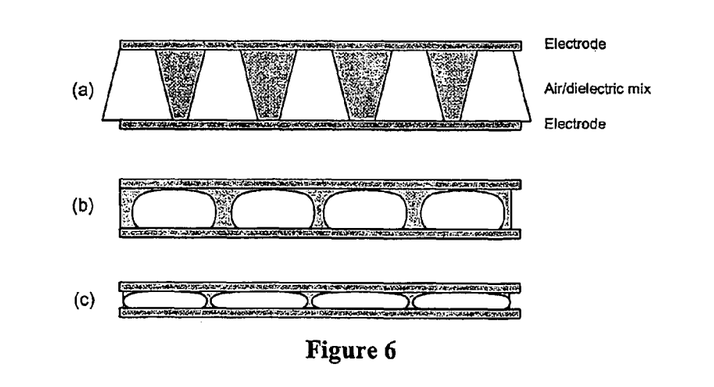
FIG. 6 shows a diagram illustrating how the air/dielectric ratio changes under (a) no compression, (b) moderate compression, and (c) extreme compression. The effective dielectric constant will be a combination of the dielectric constant of the elastomer (clear) and air (shaded).

Another characteristic feature influencing geometric spacing is the effective dielectric constant of the sensing layer. Since the sensor operates under ambient conditions, the dielectric constant of the capacitor is a combination of the elastomer dielectric constant and that of the air surrounding the projections, as illustrated in FIG. 6. As the sensor is compressed, the projections compress and air is forced out of the sensor. As higher loads are applied, more air is forced out and the dielectric constant shifts more towards that of the elastomer (i.e. higher value).

Another design issue is related to the mechanical stability of the projections and their aspect ratios. An projection which has a column-like profile with a height to width aspect ratio of 0.5 (a cube) will be very stable when compressed and give predictable deformation. When the aspect ratio is increased the projection begins to resemble a tall and narrow column, which is not stable when a load is applied. In this case, there will be unpredictable buckling of the column, which creates a discontinuity in the sensor output as well as creating a non-linear response to applied pressure. This means that a sensor will not have a high level of repeatability and can give unpredictable pressure measurements. In the case of a triangular geometry with a very narrow top, as shown in FIG. 5, there is no predictable direction that the triangular projection will shift to when a compressive load is applied. In addition to the bucking, the projection will begin to fold over on itself.

Trapezoidal (with a tapered width and a non-pointed top) or domed projections are more stable and provide predictable and repeatable deformation without buckling or folding. By having projections that have predictable deformation, the sensor becomes more accurate and the measurements become more repeatable. The deformation of the projections can be modeled mathematically to correct and compensate for creep and hysteresis.

Figure 7:
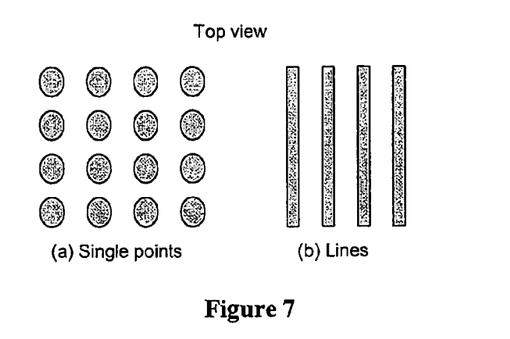
FIG. 7 shows a top view of alternative embodiments of a textured elastomer dielectric.

In one embodiment, the discrete projections may comprise single points or lines. Single points may have regular or variable shapes as described above. Lines may have profiles which are rectangular, square, trapezoidal, or curved. Exemplary domed points and rectangular lines are shown in FIG. 7.

The planar elastomeric dielectric may be used in single or multi-layer sheets. A single sheet with single points will typically be lighter and more flexible than a single sheet consisting of lines (with the same spacing and cross-sectional shape).

Figure 8:
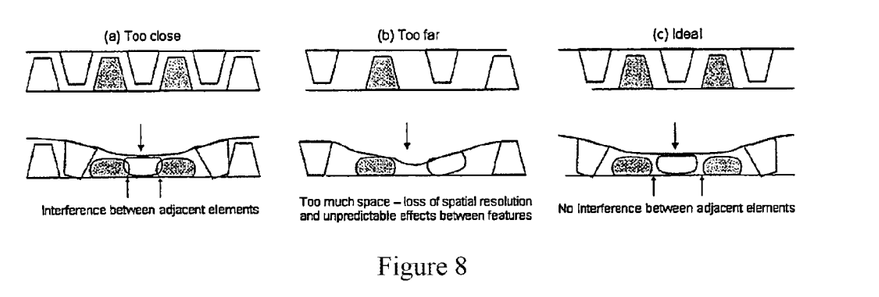
FIG. 8 shows variations of two interlocked textured elastomer sheets with (a) close, (b) far, and (c) optimized spacing.

A multi-layer dielectric may include two or more sheets. In one embodiment, the dielectric comprises two opposing pair sheets. The use of multi-layers may increase the operating pressure range as well as reduce other effects such as creep and hysteresis. The opposing pair sheets may be aligned so the projections are interlocking, or are corresponding. If interlocking, the projections fit inbetween the opposing projections as shown in FIG. 8. If corresponding, the projections partially or entirely overlap with the opposing projections. If the projections are interlocking, mechanical interference issues must be considered when choosing the dimensions of the projections and their spacing. In this configuration, the overall thickness of the two layers is only marginally higher than the single layer.

In another embodiment, the two opposing pair sheets each comprise a line configuration, where the two sets of lines are an angle to each other. It is convenient to dispose the lines at right angles to the opposing lines. As with the other configurations, mechanical interference must be considered and the geometry and spacing are chosen having the sensor properties and intended uses in mind.

Figure 10:
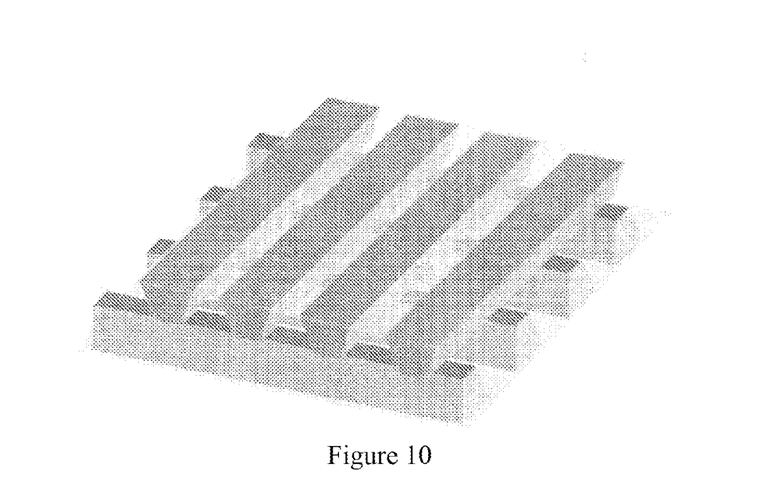
FIG. 10 shows a schematic configuration of opposing pair sheets each having parallel lines, disposed at a right angle to the opposing lines.
Figure 11:
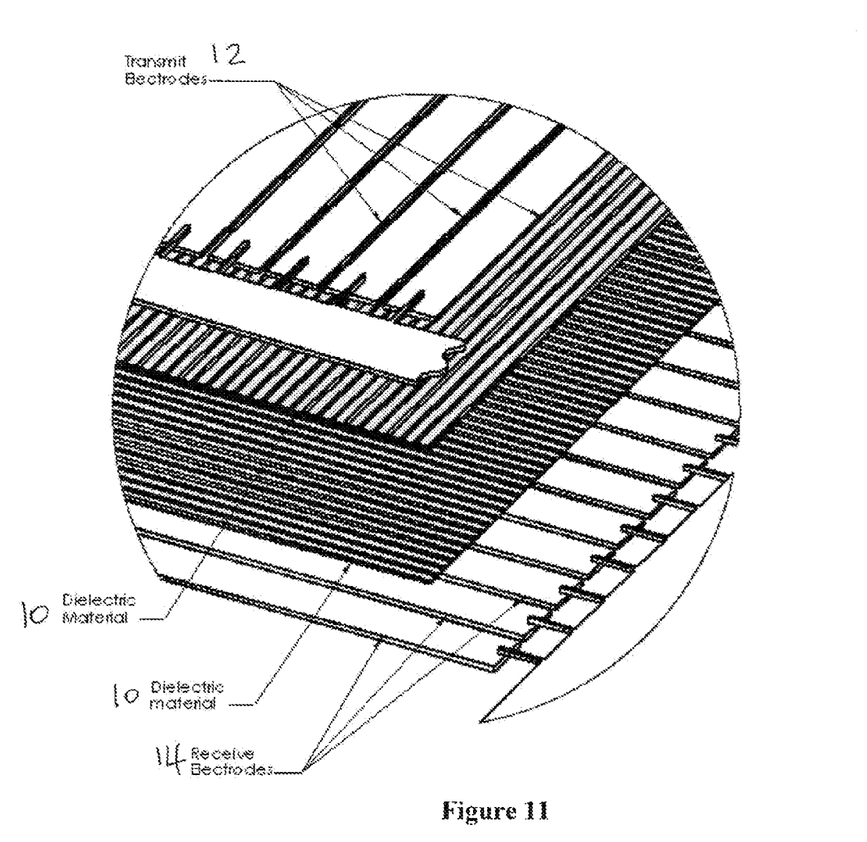
FIG. 11 shows a schematic of a portion of a pressure sensing system comprising the opposing pair sheets shown in FIG. 10.

In one embodiment, as shown in FIG. 10, each line has a trapezoidal profile, and the two opposing line patterns are at right angles to each other. This configuration effectively doubles the thickness of the dielectric layer, but also increases the maximum pressure that can be detected by the sensor.

In one embodiment, each projection may be about 0.25 mm up to about 2 mm in diameter. The spacing between projections may vary from about 0.1 mm spacing with the smaller sized projections up to about 2 mm spacing for the larger sizes. Packing density of single point projections may be increased by using geometric patterns such as honeycomb or other patterns as opposed to simple row/column grids.

As will be apparent to those skilled in the art, various modifications, adaptations and variations of the foregoing specific disclosure can be made without departing from the scope of the invention claimed herein.

What is claimed is:

1. A pressure mapping system comprising:
a plurality of electrode columns,
a plurality of electrode rows,
a solid elastomer dielectric separating the electrode columns and electrode rows, wherein said solid elastomer dielectric comprises at least one planar sheet having two major surfaces, wherein at least one major surface comprises a pattern of projections, each projection being spaced from adjacent projections so as to be deformable under compression from an applied force, the projections providing more resistance to compression as the applied force is increased,
a two-dimensional matrix of sensor cells, wherein each sensor cell is defined by the intersection of an electrode column, an electrode row and at least one projection, and
an electronics module coupled to the matrix of sensor cells, the electronics module determining a pressure at each sensor cell based on the compression of the sensor cell, the determined pressures defining a two-dimensional pressure distribution based on the compressions of the two-dimensional matrix of sensor cells.

2. The system of claim 1 wherein the projections comprise single point projections and the pattern of projections comprises a plurality of rows or columns.

3. The system of claim 1 wherein the projections comprise line projections.

4. The system of claim 1 wherein the solid elastomer dielectric comprises two planar sheets, each planar sheet having a major surface with a pattern of projections, such that the pattern of projections from the two planar sheets are opposing.

5. The system of claim 4 wherein the opposing pattern of projections are interlocking 6. The system of claim 5 wherein the opposing pattern of projections are corresponding.

7. The system of claim 6 wherein the opposing patterns of projections are each a plurality of substantially parallel lines, and the opposing patterns are at an angle to each other.

8. The system of claim 7 wherein the angle is about 90°.

9. The system of claim 7 wherein at least one pattern of projections is parallel to an electrode column or an electrode row.

10. The system of claim 2 wherein each single point projection has a planar cross-sectional shape comprising a circle, an oval, a quadrilateral, a triangle, or an irregular shape.

11. The system of claim 10 wherein each single point projection has a vertical cross-sectional shape comprising a square, a rectangle, a trapezoid, a semi-circle, a semi-oval, a triangle or an irregular shape.

12. The system of claim 3 wherein each line projection has a vertical cross-sectional shape comprising a square, a rectangle, a trapezoid, a semi-circle, a semi-oval, a triangle or an irregular shape.

13. The system of claim 1 further comprising:
a computer system coupled to the electronics module, the computer system graphically displaying the two-dimensional pressure distribution.

14. The system of claim 13 wherein the computer system graphically presents the two-dimensional pressure distribution as a two-dimensional matrix of pressure distributions at a single point in time.

* * * * *